United States Patent
Erickson

(10) Patent No.: US 11,129,338 B2
(45) Date of Patent: Sep. 28, 2021

(54) GROUND TO CANOPY GASEOUS MEDIA DELIVERY SYSTEM FOR CROPS INCLUDING LEAK DETECTION AND HOOK AND WAND FEATURES

(71) Applicant: Stewart E. Erickson, Hudson, WI (US)

(72) Inventor: Stewart E. Erickson, Hudson, WI (US)

(73) Assignee: The Agricultural Gas Company ( * ) Notice: Subject to any disclaimer, the term of this patent is extended or adjusted under 35 U.S.C. 154(b) by 369 days.

(21) Appl. No.: 16/151,655

(22) Filed: Oct. 4, 2018

(65) Prior Publication Data

US 2019/0098841 A1  Apr. 4, 2019

Related U.S. Application Data

(60) Provisional application No. 62/567,821, filed on Oct. 4, 2017.

(51) Int. Cl.
| | |
|---|---|
| *A01G 7/02* | (2006.01) |
| *A01G 7/06* | (2006.01) |
| *A01G 17/00* | (2006.01) |
| *A01G 9/18* | (2006.01) |

(52) U.S. Cl.
CPC ............. *A01G 7/02* (2013.01); *A01G 7/06* (2013.01); *A01G 17/00* (2013.01); *A01G 9/18* (2013.01)

(58) Field of Classification Search
CPC ... A01G 7/02; A01G 9/18; A01G 7/00; A01G 7/06; A01G 17/00

USPC ............................................................ 47/17
See application file for complete search history.

(56) References Cited

U.S. PATENT DOCUMENTS

| | | | |
|---|---|---|---|
| 5,713,154 A * | 2/1998 | Goldstein | A01G 9/24 47/17 |
| 10,856,480 B2 * | 12/2020 | Moffitt | A01G 9/025 |
| 2013/0111811 A1 * | 5/2013 | Miyauchi | A01G 9/246 47/57.7 |

* cited by examiner

*Primary Examiner* — Christopher D Hutchens
*Assistant Examiner* — Steven J Shur
(74) *Attorney, Agent, or Firm* — Skinner and Associates; Joel D. Skinner, Jr.

(57) ABSTRACT

An upward, vertically extending agricultural gas distribution system is disclosed. The gas distribution system is useable for orchards, plantations, and other permanent or semi permanent crops. The gas delivery system includes a gas supply, a flexible tube, and a rigid tube. The gas supply is adapted to be disposed proximate the bottom of a plant. The flexible tube is connected to the gas supply and has a lumen for communication of gas from the gas supply. The flexible tube is adapted to be oriented vertically along the vertical length of the plant. The rigid tube is connected to the flexible tube and also has a lumen for communication of gas from the flexible tube. The rigid tube has at least one gas emitter for release of gas from the rigid tube lumen to the exterior environment. The rigid tube is adapted to be oriented vertically along the vertical length of the plant, above the flexible tube. Tree couplers, gas wands, gas flow indicators, and gas flow control valves are also disclosed.

16 Claims, 9 Drawing Sheets

GROUND TO CANOPY GASEOUS MEDIA DELIVERY SYSTEM FOR CROPS INCLUDING LEAK DETECTION AND HOOK AND WAND FEATURES

CROSS-REFERENCE TO RELATED APPLICATIONS, IF ANY

This application claims the benefit under 35 U.S.C. 119 of U.S. Provisional Patent Application Ser. No. 62/567,821, filed Oct. 4, 2017, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to agricultural systems, apparatus and methods. Particularly, the invention relates to a system of delivering gases to crops. Most particularly, the invention relates to an integrated, self-supporting gas delivery system for crops, leak detection systems and devices, and valve systems and devices.

2. Background Information

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides an agricultural system, apparatus, and method which are beneficial, practical, reliable, and efficient, and which are believed to fulfill the need and to constitute an improvement over the background technology.

In one broader aspect, the invention provides an agricultural gas delivery system comprising:

a gas supply adapted to be disposed proximate the bottom of a plant;

a flexible tube connected to the gas supply, the flexible tube having a lumen for communication of gas from the gas supply, the flexible tube being adapted to be oriented vertically along the vertical length of the plant; and a rigid tube connected to the flexible tube, the rigid tube having a lumen for communication of gas from the flexible tube, and at least one gas emitter for release of gas from the rigid tube lumen to the exterior environment, the rigid tube being adapted to be oriented vertically along the vertical length of the plant, above the flexible tube.

In one more specific aspect, the invention provides an agricultural gas delivery system for delivering at least $CO_2$ gas to a plant of the type having a trunk and foliage, comprising:

a. a gas supply adapted to be disposed proximate the bottom of a plant;

b. a flexible tube connected to the gas supply at a node, the flexible tube having a lumen for communication of gas from the gas supply, the flexible tube being adapted to be oriented vertically along the vertical length of the plant, the flexible tube having a predetermined length that permits wrapping around the trunk of the plant and to extend automatically if the plant trunk increases in length or width;

c. a rigid tube connected to the flexible tube, the rigid tube having a lumen for communication of gas from the flexible tube, and at least one gas emitter for release of gas from the rigid tube lumen to the exterior environment, the rigid tube being adapted to be oriented vertically along the vertical length of the plant, above the flexible tube, the rigid tube being substantially straight to permit extension into the foliage of the plant above the flexible tube and the trunk of the plant;

d. a connector attached to the rigid tube, the connector adapted to releasably couple the rigid tube to the plant foliage or trunk.

The aspects, features, advantages, benefits and objects of the invention will become clear to those skilled in the art by reference to the following description, claims and drawings.

DETAILED DESCRIPTION

1. Ground to Canopy Gaseous Media Delivery System

Figure 1:
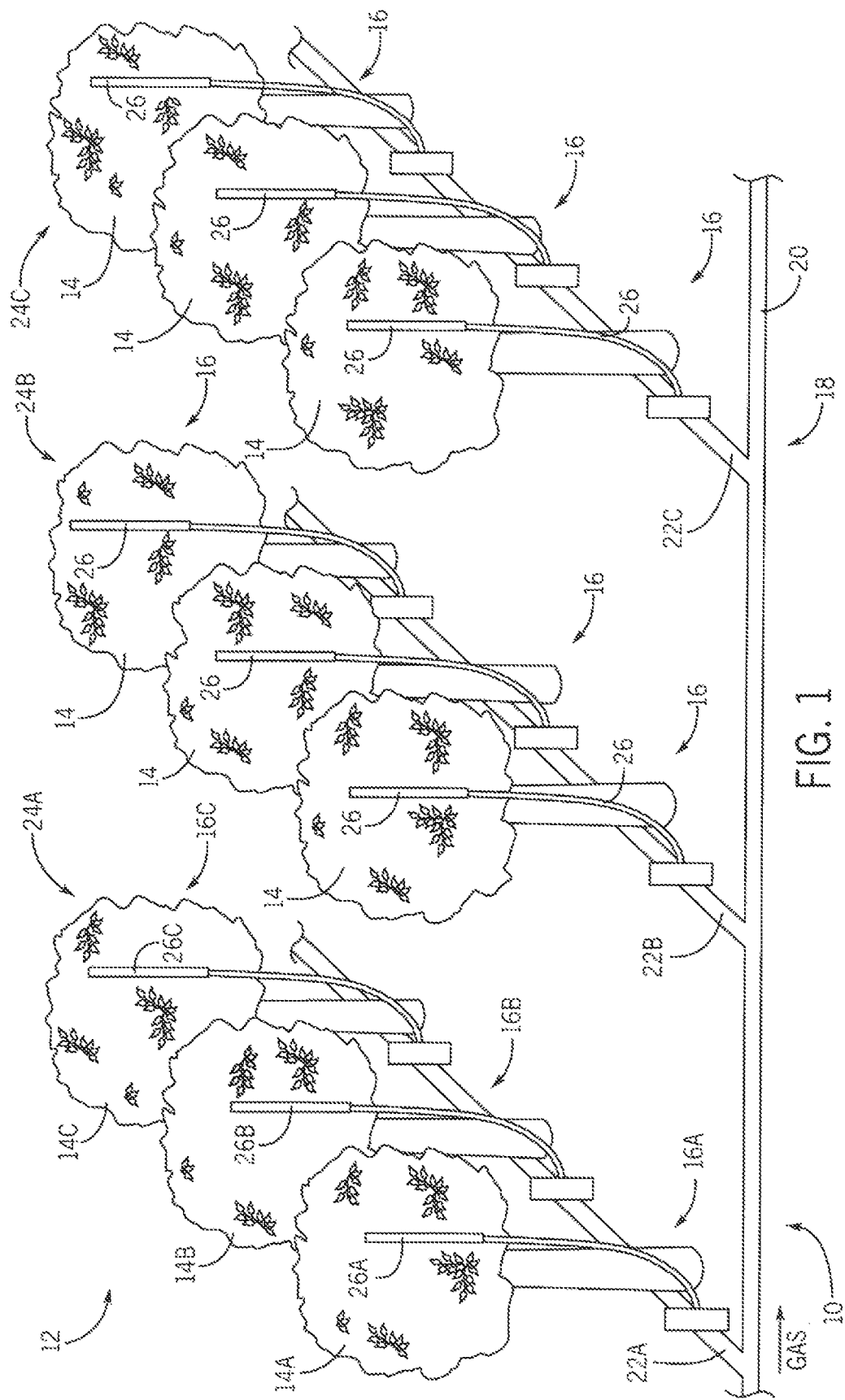
FIG. 1 illustrates an embodiment of an integrated, upwardly depending gas delivery system of the invention, operatively deployed in an orchard.

FIG. 1 illustrates an embodiment of the integrated, gas delivery system 10, operatively deployed in an orchard 12, for example a citrus orchard. In this embodiment the citrus orchard is an orange tree grove. The system 10 delivers enriched gaseous medium, such as $CO_2$ enriched gas, oxygen deprived gas, thermally treated air, or pheromones, to vertically ascending crops such as citrus trees. The system 10 and method are also suitable for use with vegetable crops grown on trellises (such as egg plants, taller varieties of tomatoes or peppers); with permanent crops grown in hedgerows such as tea, coffee; in viticultural practices (such as raisins, table grapes or wine grapes) or orchards. The system 10 is ideally suited for use with mandarin orange trees. The gas is delivered to the canopy 14 of each tree 16 through a ground based line assembly 18 including a main supply line 20 and plural secondary lines 22 arranged with each row 24 of trees 16 in the orchard 12. The secondary lines 22 are connected to vertical tubes 26, which ascend each tree 16. The tube 26 have an annular space or lumen dedicated for gas deliveries to plant foliage (canopy) 14. The tubes 26 are supported by a trellis (not shown) or by a branch or branches of the tree 16.

Figure 2:
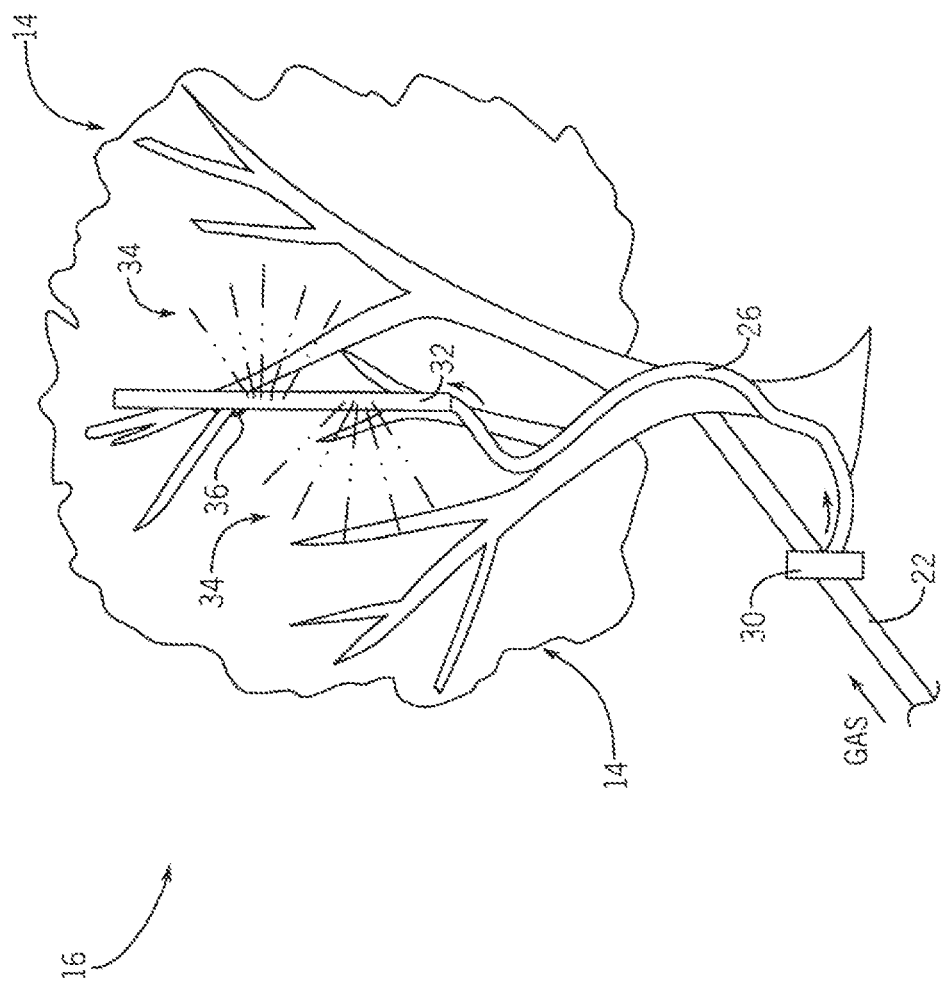
FIG. 2 illustrates an embodiment of an individual tree assembly of the system, deployed in an individual tree.

FIG. 2 illustrates an embodiment of an individual tree 16 assembly of the system 10 deployed in an individual tree 16, and illustrating bottom up delivery of gas to tree foliage or canopy 14. Gas is supplied via secondary line 22 to vertical tube 26. Preferably, a delivery line control node 30 interfaces each tube 26 to the secondary line 22. A preferred tube 26 type is known as "spaghetti connector" tubing. The flexible spaghetti tubing 26 is connected to a rigid emitter tube 32 disposed proximate the top of the tree 16 in its foliage 14. The emitter tube 32 also has a central gas supply lumen and further includes one or more emitters 34. In one embodiment, the emitters 34 are apertures in the rigid tube. The emitter tube 32 is coupled to the tree via an attachment hook 36.

In the orchard industry, and in the past, it has been known to have micro sprayers which cover an area of soil to promote widespread root growth of the trees, which is favorable for the good health of the trees. In the system 10 of this invention, enriched gas ($CO_2$), thermally treated air, pheromones or the like) is delivered more closely to the canopy foliage of the vertical foliage, comparatively to irrigation tubes that deliver water to the ground. When orchards 12 are planted with saplings or juvenile trees, the foliage of the trees 16 occupies a very small percentage of the overall acreage of the orchard 12 or vineyard because the saplings and/or juvenile crop have to be planted at great intervals to allow proper spacing whence the trees/crops grow to maturity and have extensive foliage canopies. Therefore, the invention includes a ground delivery pipe 22 with a node 30 at individual trees 16 that has an annular space to conduct gas for emission immediately adjacent to the foliage 14 of the crop. The gas is delivered directly at the foliage 14 rather that at ground level and allowed to disperse through the field. Further, since the foliage is elevated and continues to move upward with growth, from year to year for permanent crops, it is desirable to install the integrated gas tube in a vertically ascending position closing chasing the height of the crops foliar canopy, and providing slack in a bottom up flexible tubing 26—commonly referred to as "spaghetti pipe" or the likes with one or more emitters 32 located upwardly into the juvenile plant therein desirably releasing the gas directly to the area of the saplings' foliage 14. In the preferred embodiment, a gas supply line 20/22 would be installed at a ground position with lateral off-take nodes 30 at the trees location. An upwardly ascending tube 26 would be installed directly below each juvenile plant, and be upwardly depending providing the slack length being properly sized to eventually reach from the ground supply line 22 up to the anticipated mature foliar leafy area 14 of the plant. This upwardly ascending gas emission is desirably adjusted on an annual or semi-annual basis, to emit $CO_2$, other beneficial gases at corrected heights and length and emission rate to "match" the crop as it attains vertical leafy growth and leafy canopy dimension. This can be accomplished by hooking 36 the tube upward, using up the slack provided in the spaghetti portion 26 of the tube, lengthening to a location, just below the top of the lea& area. Additional emitters can be opened up as the dimension of the canopy expands so that the gas will minor and adjacently flow to the elevated leafy canopy. In the preferred embodiment, the emitter orifices 34 from the annular space could be vertically arranged in either an open or closed position to accommodate different growth heights of the crops foliage. That is when the seedling is started and staked up the lower orifices would be opened and upper orifices would be closed thereby conserving gaseous emissions and pumping costs. As the crop 12 matures and grows vertically upper orifices are opened adjacent to the foliage and lower orifices might be left open or closed, whichever, is most efficient for foliage exposure to gas enrichment.

In another embodiment of the system, buried manifolds running the width of a field of crops notably an orchard and plantation, are connected to multiple delivery lines that track substantially the length of the rows of permanent crops like trees, therein carrying gaseous media for distribution to the foliar canopy of crops and individual trees. Lines tracking the length of the tree rows preferably have lateral exit ports to effectively address each tree within the row, with an effervesce of gaseous media including $CO_2$ enrichment.

Lateral nodes address the trees and provide an upwardly depending delivery line. They preferably have pressurized gas release control so that there is uniform gas distribution from the first trees in the row, to the last trees in the row, which maybe located ¼ mile of more away.

A vertically ascending tube transmits the gas upwardly and to within close proximity of the foliar canopy. For a mature row of mandarin oranges the height location of the emitters would be about 7 to 11 feet off the ground. For larger varieties and species the lateral lines' "reach height" can be greater, but delivery of the gaseous effervesce is adjusted proximate to include the upper reaches of the foliar canopy where a great deal of sunlight is incident and photosynthesis abounds. For lessor stature species the lateral lines' reach height would be less. In the preferred embodiment, the vertically ascending delivery tube has at least one emitter port to provide gas to essentially all of the tree canopy. The emitter port is capable of pressure equalization so that there is uniform gas distribution from the first trees in the row, to the last trees in the row.

The lateral upward depending delivery line and gaseous emission provide greater gaseous volume as the tree grows larger. Emission produces more gas by increasing the line pressure, as the tree grows larger volumetrically. The vertically ascending tubes produce more gas by increasing the number of tubes and/or emitters as the tree grows larger volumetrically. As the tree grows taller the emission points may be extended higher into the tree. As the tree grows wider, the emission points are more broadly distributed into the tree.

For trees that are mechanically harvested—like the very aggressive "Shaker" machine to make nuts fall off the trees the invention calls for placing the vertically ascending tube in a position that will not encourage damage by the "Shaker" or other equipment as it engages the tree with associated gas line. Also a guard can be provided over the vertically ascending tube to protect it, or a more rugged section of tubing at that location, where it may be engaged by a harvesting machine.

Figure 8:
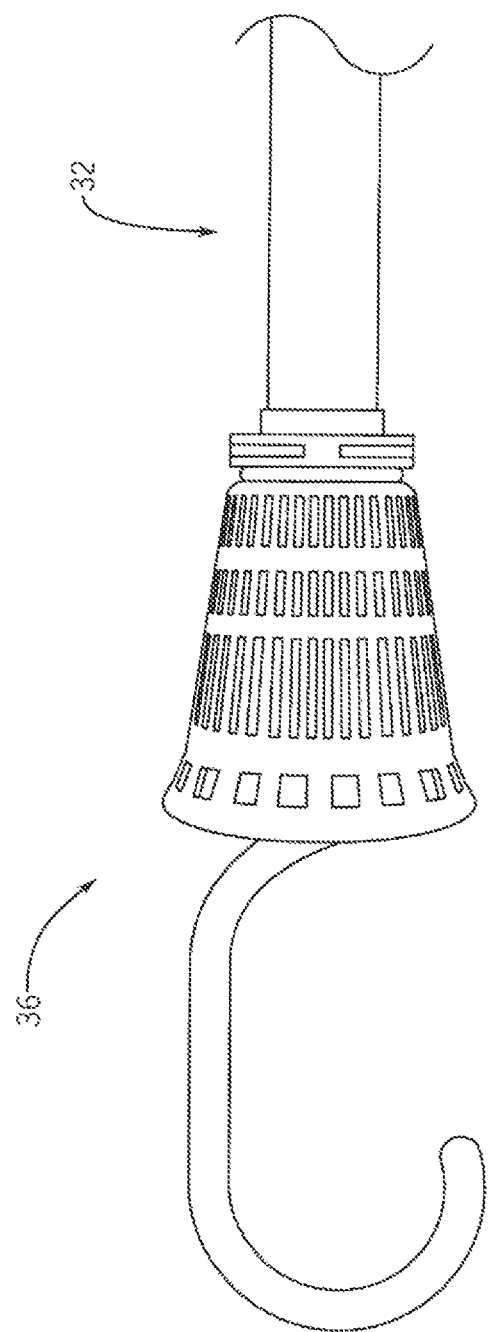
FIG. 8 shows an embodiment of a hook and emitter wand useable in the integrated gas delivery system of the invention.

Referring to FIGS. 2 and 8, the current invention also provides a device for securely fastening the vertically ascending tube 32 to a branch, wherein the fastening is providing an engage ably releasable hook 36 to fasten the tubes to an upward branch of the tree. As the tree grows, the hooking location is moved upward from year to year as the tree grows. The hook has weight to keep it engaged with the branch during wind. The hook can be plastic or is metal or has a metal ballast to weight it down and make it hang securely in windstorms. And the hook can have a receiver to clasp the ascending line securely.

In the invention, installation is preferably accomplished from the ground and is generally performed by hand. Installation into taller trees can be accomplished by employing an extension wand.

Returning to FIG. 2, the vertically ascending delivery tube assembly preferably comprises two primary components: First, is the flexible section 26—commonly known as "spaghetti pipe" that is near the ground and is attached to the delivery line 22 lateral off-take node 30 at the ground and provides the necessary slack distance to reach up a mature tree, and having leak-proof connections. Secondly, the rigid or semi rigid section of pipe 32 with emitters 32 that create the "vertical wand" so the installer can quickly and easily reach higher into the tree to a suitable hooking branch location. Hook 36 is provided on the end of the wand 32.

In the case of mandarin oranges, the spaghetti pipe 26 is approximately 6 feet long and the rigid emitter component "wand" 32 is preferably about 5 feet long, combined providing an overall upward reach of 11 feet to its branch hook point 36. For taller trees the wand 32 can be a separate rigid handheld extension, that raises all systems into trees providing a releasably engageable connection to lift, hook, and then detach from the elevated emission element.

The hook 36 or rigid element 32 can desirably have a male/female connection that is readily disengaged from the wand once the emitter element 32 is hooked on the branch. The mail/female connection can be a loosely fitting vertical rectangle shape male and corresponding female receiving cup.

In an alternate embodiment the extension wand 32 has a magnet that can releasably engage from a metal receiver located on the upward elevated element, for insertion, altering heights, or removal from the tree canopy.

The device and method may be used in conjunction with an Aerial Application manufactured and sold by AgGas of Hudson, Wis., USA, as the supply to the wind foils in the early years of plant growth.

The invention has many benefits. The primary benefit is inexpensive, quick adaption and installation into existing orchards. And, the method is agronomically correct for existing farming functions without disruption to the farmers. This allows gas to get to the elevated leafy canopy that is fully exposed to sunlight which is where most of the photosynthesis occurs.

The present invention will allow direct application of $CO_2$ to the foliage of saplings and juvenile vines as they grow vertically. Growth of these immature trees is very essential and the economics would be greatly enhanced if the new orchard, vineyards and crops could be brought into greater production at an earlier date. Further, because the young orchards, vineyards and crops have to provide wide spacing between the seedlings and the soil/ground is very susceptible to wind and heat from direct sunlight, which furthers water losses, which is costly, and can stress the immature plants. New seedlings are also more susceptible to mortality; drought, disease, etc. so by "pampering" the saplings with $CO_2$ the overall economics off the orchard industry can be greatly increased. And farmers want high performance yields from the mature orchards which the herein disclosed system will deliver.

Once mature crops have specific spacing and some are open grown wither for mechanical needs or for the needs of the crop itself. At maturity the vertical gas needs would be provided without any nuisance.

Although the invention has been described and shown without LED lighting integrated, it is within the purview of the invention and is incorporated by reference AgGas' LED COMBINED Technology.

2. Leak Detection System, Including Auto-Shutoff Valve

Rats, rodents like gophers, farm machinery and labors commonly cause leaks in micro-irrigation tubing that need to be repaired. However, unlike water micro-irrigation systems, detecting and stopping leaks from the similarly designed poly-tubing-gas delivery systems is much more problematic because the gas is indivisible; i.e. you don't see a wet spot on the ground where the leak is occurring.

The states of the system include a "Default Setting" for the night when the system has no pressure from $CO_2$ delivery (unless delivering other nighttime gases), a "Flagged" situation, and an Un-Flagged situation to start with.

Figure 3:
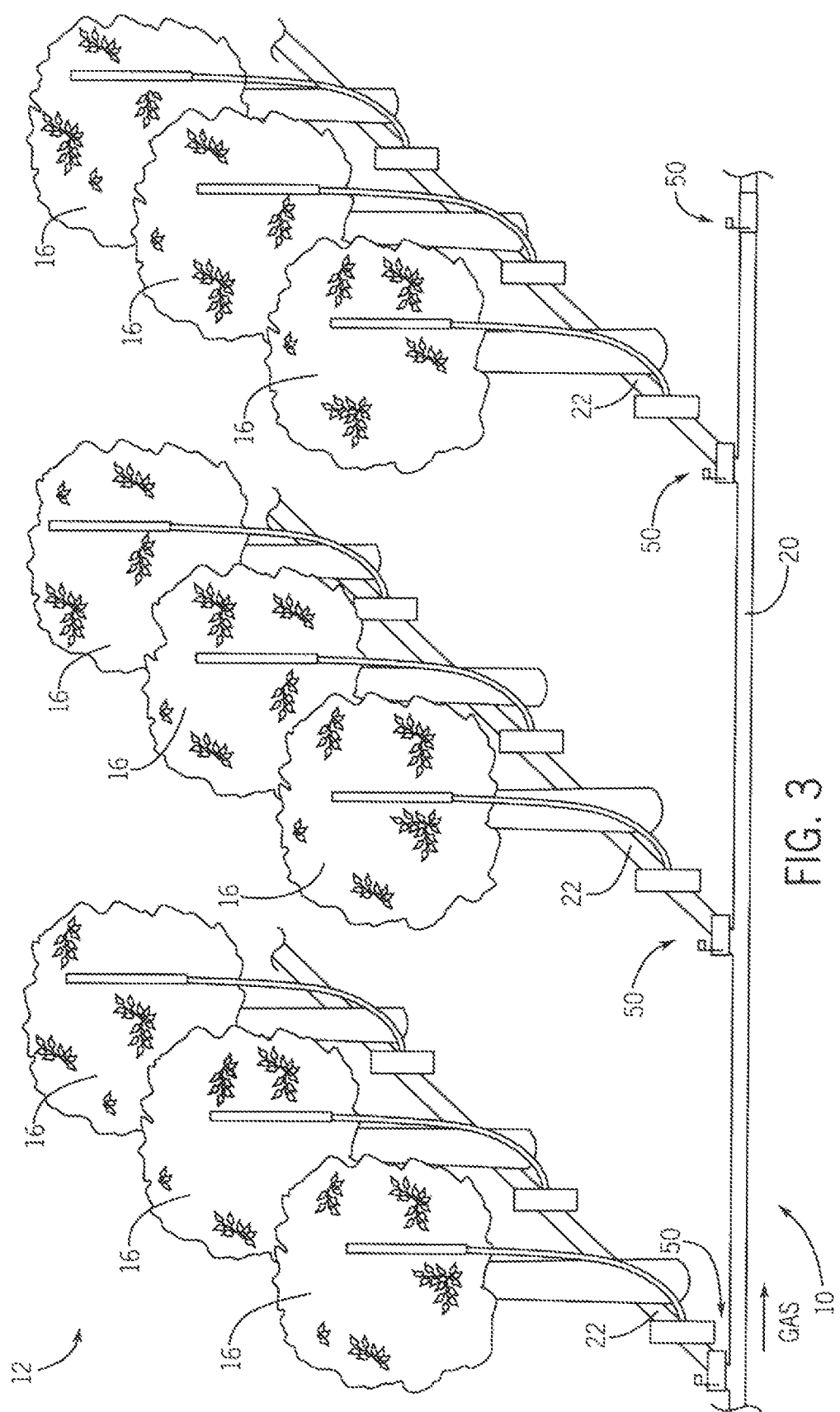
FIG. 3 illustrates another embodiment of the system, including a leak detection system.

Referring to FIG. 3, the gas delivery system 10 described above, preferably also has one or more gas flow indicators 50. The indicator 50 includes a small sealed balloon or inflatable membrane that is secured to the gas supply line 20 and/or 22. The balloon 50 maybe encapsulated within a cylinder that allows the inflatable membrane to expand and contract within the cylinder. The cylinder also containing a weighted rigid material that rests rather imperfectly into the female cylinder that can rise and fall as the inflatable membrane expands or contracts. The rigid piece provides a "short lever" position under a longer armature that is secured on one end with a pivot point and the upper other end representing a "Flag Pole". This device works smoothly raising the flag when the gas delivery system 10 is pressurized, and lowing the flag when the system is shut down or when there is a leak in that particular supply line that it signals the pressure or engages the unrestricted flow valve.

Either with an automatic unrestricted flow shut-off valve and/or manually, isolating a section of the system 10 when notified by a signal event, and then injecting smoke, steam or other visible media under pressure into the isolated section to identify the leak location.

The flag pole indicator 50 also incorporates a downstream "T" to allow smoke under pressure to be introduced into the isolated section of the system for leak detection, and upstream a shut flow restrictive valve—halts free flow of gas if the supply line is punctured or ruptured.

The valve can incorporate a simple T-in-port on the downstream side to allow smoke, or colored gas to charge the section of line for leak location identification. The indicator 50, whether it is of the Balloon, Tip Up, or PopUp style, is disposed at end of a line (main 20 or secondary 22), but maybe disposed mid-line. A mass flow valve is disposed at supply side/start of each line, by the manifold; if no resistance/leak valve shuts off. The system 10 also preferably includes an override switch.

If a line is "Flagged" or "Signaled" as having a leak, the operator will seek to detect its location with $CO_2$ sensor, for example, by driving by on the downwind side looking for meter spike and visually inspect the line If the leak is not located when signaled; a shut off of that particular line for the day or longer may be done, at the junction or clamp the line shut choking it off. Isolated, Input "T" inline, is on crop side of supply manifold and shutoff valve. Fog or smoke is put in during daylight to spot it. Or, the user can wait until night insert cold or hot gas into that line only; drive by with night vision or infrared glasses spot the leak. When the loss of pressure is activated triggering a problem signal, the signal could also include or be a nose making device such as a whistle, using the pressure of the system on the upstream side of the shut-off.

Figure 4:
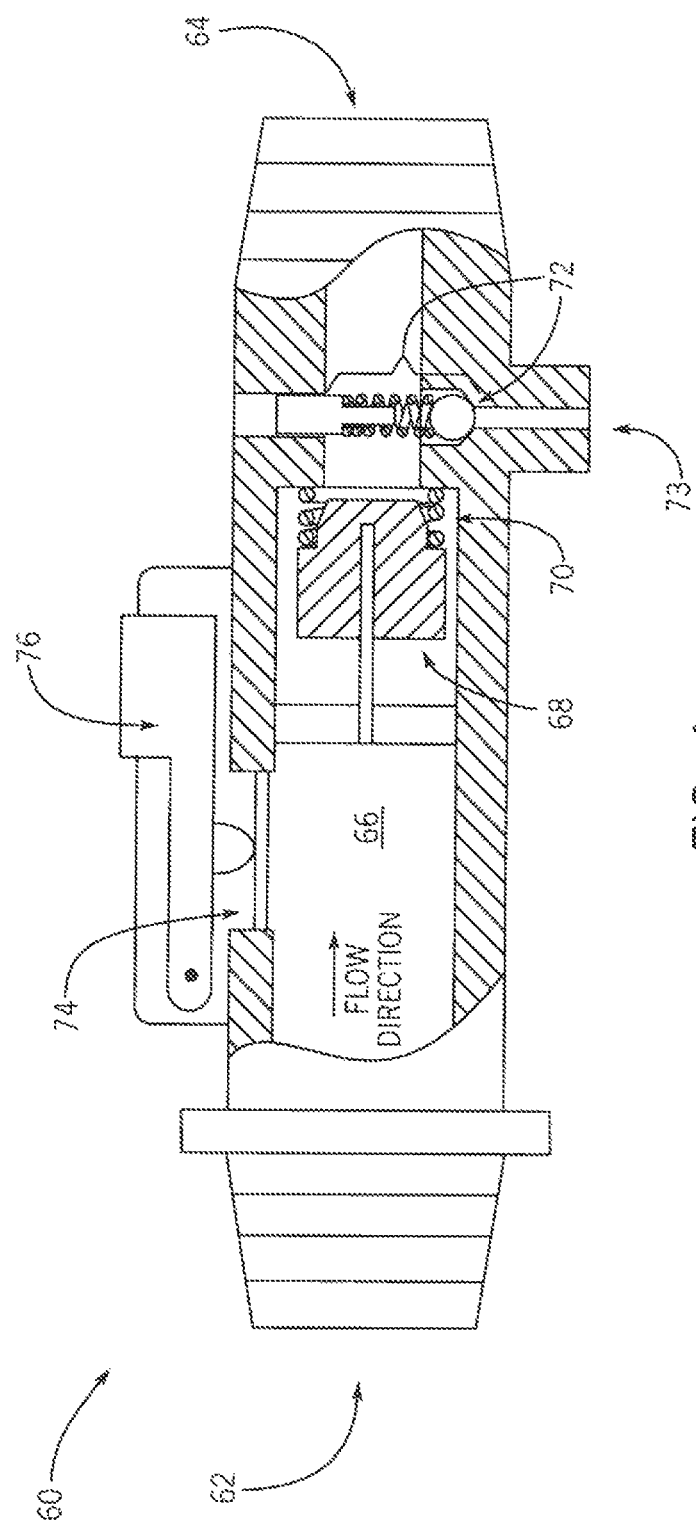
FIG. 4 illustrates an embodiment of an auto-shutoff valve of the leak detection system.
Figure 5A:
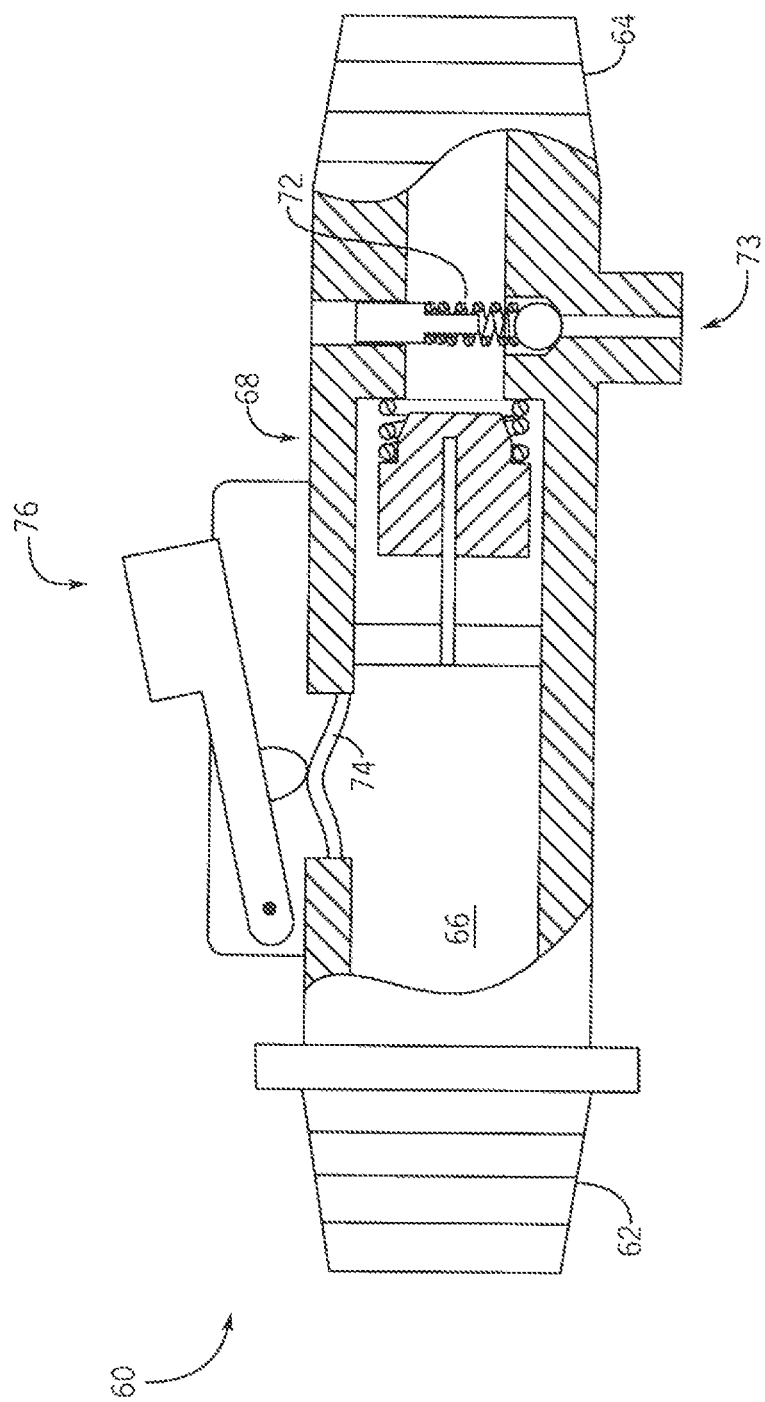
FIGS. 5 A and B show flow and no flow states of the valve.
Figure 5B:
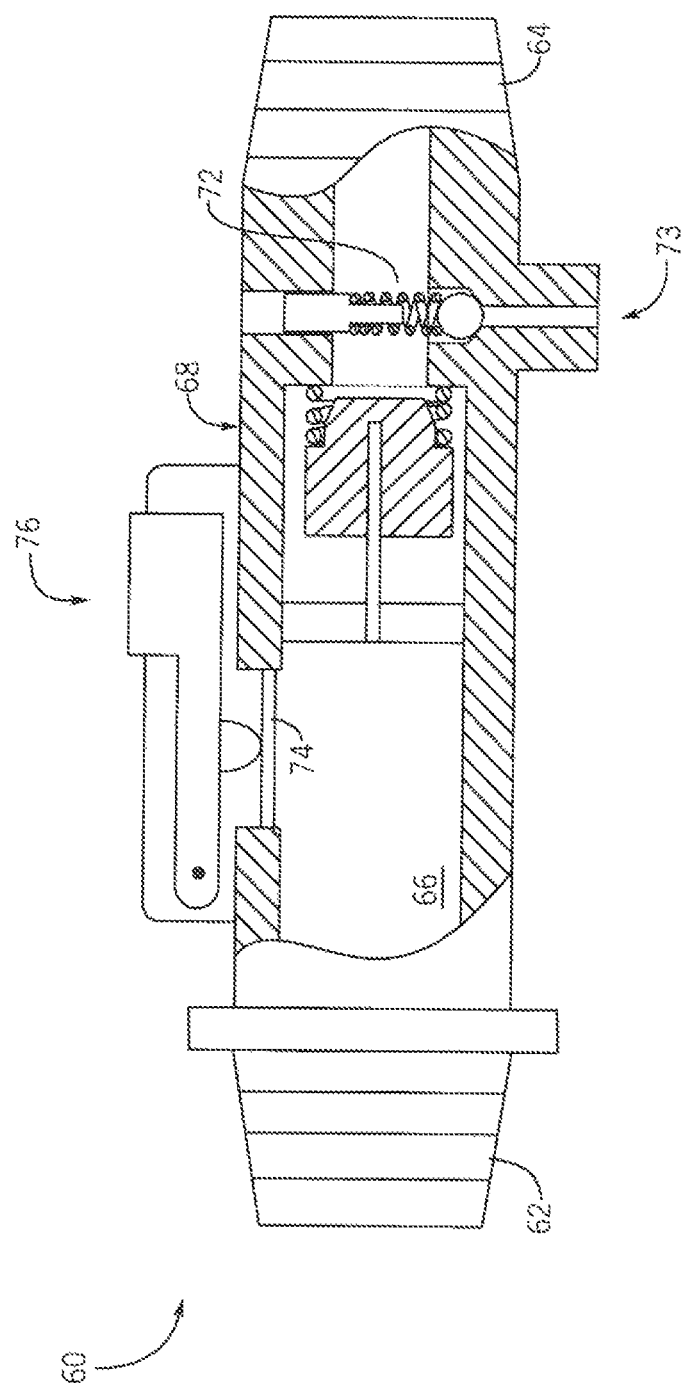
Figure 6:
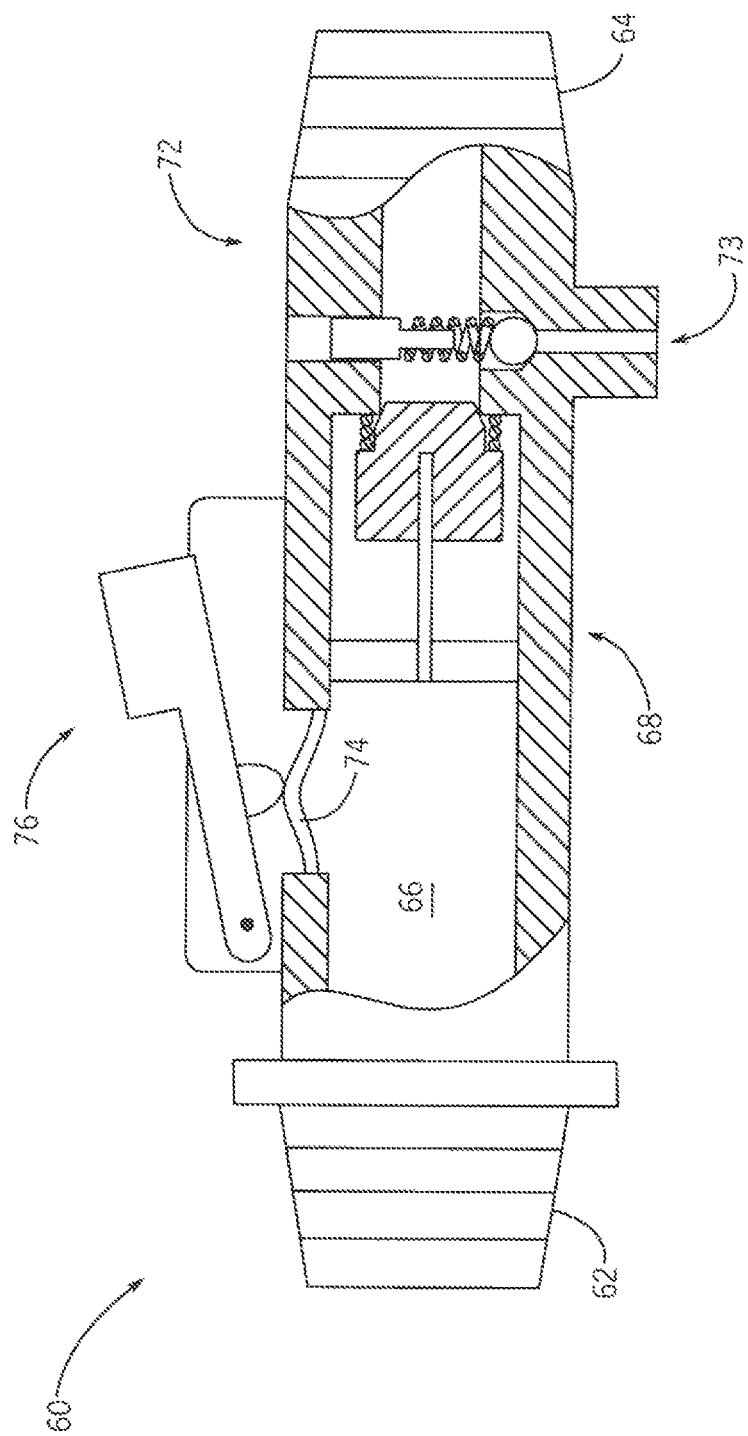
FIG. 6 shows a downstream leak mode, with pressurization and flow stopped.
Figure 7:
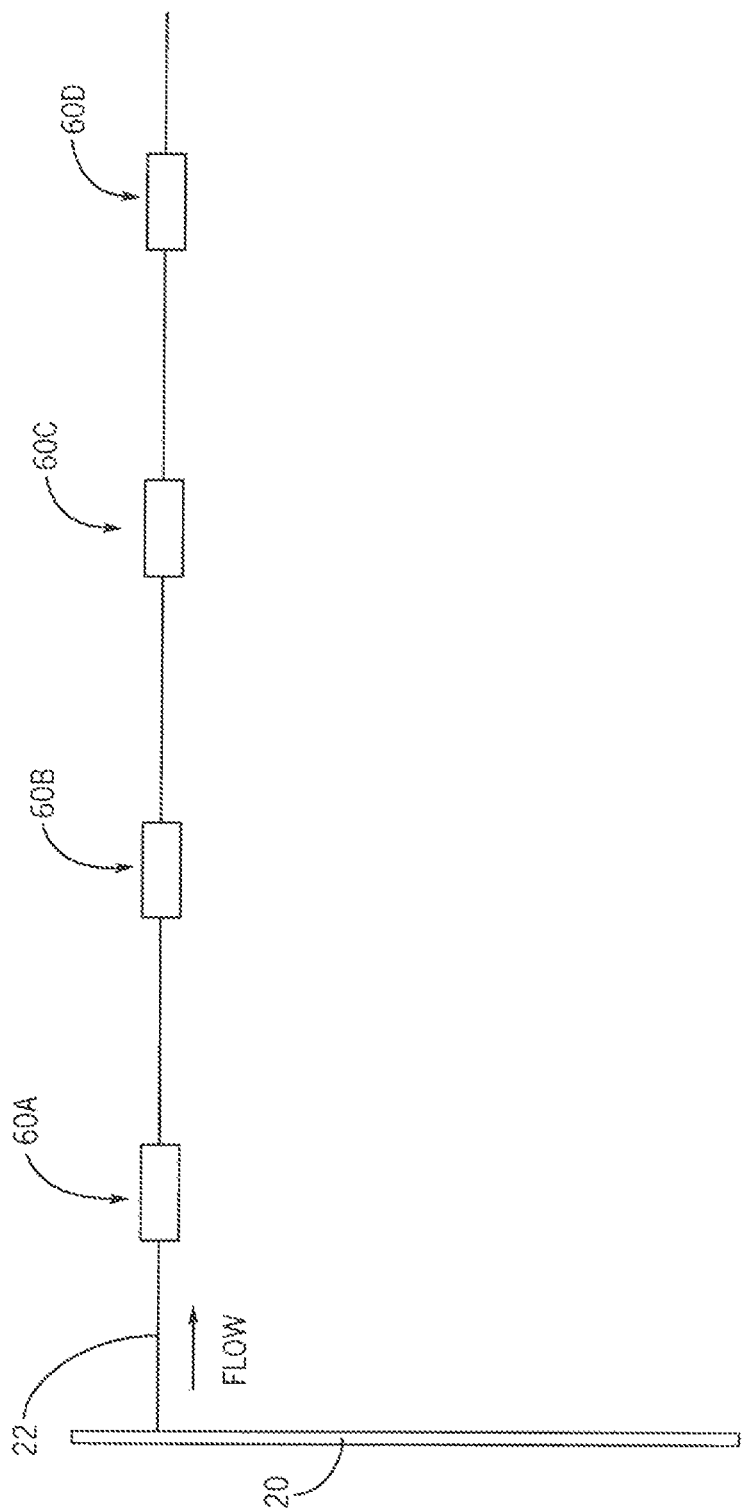
FIG. 7 is a diagram showing an arrangement of auto shut off valves in the leak detection system.

FIG. 4 illustrates an embodiment of an auto-shutoff valve 60 of the leak detection system. The valve 60 has a gas inlet 62 and gas outlet 64. Gas flows though a lumen 66 to an excess flow plunger 68. A spring 70 controls shut off flow rate. A check valve assembly 72 is disposed anterior to the gas outlet end 64 and includes smoke input port 73. A flexible membrane 74 actuate flag 76. FIGS. 5 A and B show flow and no flow states of the valve 60 respectively. With pressure, gas flows. Without pressure, no flow occurs. FIG. 6 shows a downstream leak mode, with pressurization and flow stopped. FIG. 7 is a diagram showing an arrangement of auto shut off valves 60A-D in the leak detection system, preferably four (4) devices 60 per row 22. Gas flow where the valves are open (Q) is calculated according to:

$$Q_A > Q_B > Q_C > Q_D$$

Gas flow with valves closed (QS) is calculated according to:

$$QS_A > QS_B > QS_C > QS_D$$

Different QS is achieved by spring adjustment.

3. Other Aspects

Valves and other control elements can be used with the system to introduce, isolate and "zoned off" for the introduction of a wide variety of desirable gaseous media and aerosols including but not limited to: insect control pesticides and phenomes, humidity control, frost and freeze and thermal control, fungicides and other desirable media, within specific rows, quadrants/zones or field-wide.

The emitter can be a small sphere "bud" on the end of the gas supply line with the bud containing relatively uniform holes providing for very low velocity escape of gas in lateral and upward directions primarily directionally and desirably uniformly towards the leaves with the highest photosynthetic activity. The emission system can be comprised of more than one bud and supply line, in a "hydra" style arrangement with the gas release situated and servicing the zones of highest photosynthetic activity within the leafy canopy.

The systems, apparatus and method herein may be combined with share trenching, tractors runs, anchoring and the like. They may be integrated with existing irrigation system. Watering requirements may be linked with CO2 deliveries. Lastly, the systems, apparatus and methods herein may be used in indoor farming operations in addition to the outdoor environments described.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An agricultural gas delivery system comprising:
    a gas supply adapted to be disposed proximate the bottom of a plant, wherein the gas supply supplies at least CO2 gas, and wherein the plant has a trunk and foliage;
    a flexible tube connected to the gas supply, the flexible tube having a lumen for communication of gas from the gas supply, the flexible tube being adapted to be oriented vertically along the vertical length of the plant, wherein the flexible tube has a predetermined length at least six (6) feet, and wherein the flexible tube is coiled and extendible to permit wrapping around the trunk of the plat and to extend automatically if the plant trunk increases in length or width; and
    a rigid tube connected to the flexible tube, the rigid tube having a lumen for communication of gas from the flexible tube, and at least one gas emitter for release of gas from the rigid tube lumen to the exterior environment, the rigid tube being adapted to be oriented vertically along the vertical length of the plant, above the flexible tube.

2. The system of claim 1, wherein the gas supply includes at least one main gas line.

3. The system of claim 2, wherein the gas supply includes at least one secondary gas line connected to the main gas line.

4. The system of claim 1, wherein the gas supply includes at least one gas line and a node connecting the gas line to the flexible tube.

5. The system of claim 1, wherein the flexible tube is spaghetti tube.

6. The system of claim 1, wherein the rigid tube has a predetermined length.

7. The system of claim 1, wherein the predetermined length of the rigid tube is at least five (5) feet.

8. The system of claim 1, wherein the rigid tube is substantially straight to permit extension into the foliage of the plant above the flexible tube and the trunk of the plant.

9. The system of claim 1, further comprising a connector attached to the rigid tube, the connector adapted to releasably couple the rigid tube to the plant foliage or trunk.

10. The system of claim 9, wherein the connector is a hook disposed at a terminal end of the rigid tube.

11. The system of claim 10, wherein the connector further has a terminal gas emitter disposed proximate the hook, and wherein the connector rigid tube is releasably connected to the flexible tube, whereby the rigid tube is useable as a gas wand.

12. The system of claim 1 further comprising a gas flow indicator.

13. The system of claim 1 further comprising a gas flow valve.

14. The system of claim 1, wherein there are plural plants arranged in rows in an orchard, the plants being a fruit trees, and wherein the gas supply includes at least one main gas line and plural secondary lines communicatively coupled to each of the at least one main gas lines, each secondary line extending down a row of citrus trees, and wherein the flexible tube and connected rigid tube is disposed at each fruit tree, extending vertically upwardly along each tree trunk to the foliage thereof.

15. An agricultural gas delivery system for delivering at least $CO_2$ gas to a plant of the type having a trunk and foliage, comprising:
   a. a gas supply adapted to be disposed proximate the bottom of a plant;
   b. a flexible tube connected to the gas supply at a node, the flexible tube having a lumen for communication of gas from the gas supply, the flexible tube being adapted to be oriented vertically along the vertical length of the plant, the flexible tube having a predetermined length that permits wrapping around the trunk of the plant and to extend automatically if the plant trunk increases in length or width; and
   c. a rigid tube connected to the flexible tube, the rigid tube having a lumen for communication of gas from the flexible tube, and at least one gas emitter for release of gas from the rigid tube lumen to the exterior environment, the rigid tube being adapted to be oriented vertically along the vertical length of the plant, above the flexible tube, the rigid tube being substantially straight to permit extension into the foliage of the plant above the flexible tube and the trunk of the plant.

16. An agricultural gas delivery system for delivering at least $CO_2$ gas to a plant of the type having a trunk and foliage, comprising:
   a. a gas supply adapted to be disposed proximate the bottom of a plant;
   b. a flexible tube connected to the gas supply at a node, the flexible tube having a lumen for communication of gas from the gas supply, the flexible tube being adapted to be oriented vertically along the vertical length of the plant, the flexible tube having a predetermined length that permits wrapping around the trunk of the plant and to extend automatically if the plant trunk increases in length or width;
   c. a rigid tube connected to the flexible tube, the rigid tube having a lumen for communication of gas from the flexible tube, and at least one gas emitter for release of gas from the rigid tube lumen to the exterior environment, the rigid tube being adapted to be oriented vertically along the vertical length of the plant, above the flexible tube, the rigid tube being substantially straight to permit extension into the foliage of the plant above the flexible tube and the trunk of the plant;
   d. a connector attached to the rigid tube, the connector adapted to releasably couple the rigid tube to the plant foliage or trunk.

* * * * *